L. H. BELTZER.
CHECK ROW SEED PLANTER.
APPLICATION FILED JULY 17, 1911.

1,041,000.

Patented Oct. 15, 1912.

Witnesses
Frank R Glore
H. C. Rodgers

Inventor
L. H. Beltzer
By George F. Thorpe Atty.

COLUMBIA PLANOGRAPH CO., WASHINGTON, D. C.

UNITED STATES PATENT OFFICE.

LEWIS H. BELTZER, OF HENNESSEY, OKLAHOMA.

CHECK-ROW SEED-PLANTER.

1,041,000.   Specification of Letters Patent.   Patented Oct. 15, 1912.

Application filed July 17, 1911. Serial No. 639,034.

*To all whom it may concern:*

Be it known that I, LEWIS H. BELTZER, a citizen of the United States, residing at Hennessey, in the county of Kingfisher and State of Oklahoma, have invented certain new and useful Improvements in Check-Row Seed-Planters, of which the following is a specification.

This invention relates to seed planters and is designed more especially for planting cotton seed, and my object is to produce a machine of this character which will operate efficiently and reliably.

With this and other objects in view as hereinafter appear the invention consists in certain novel and peculiar features of construction and organization as hereinafter described and claimed, and in order that it may be fully understood reference is to be had to the accompanying drawings, in which—

Figure 1:
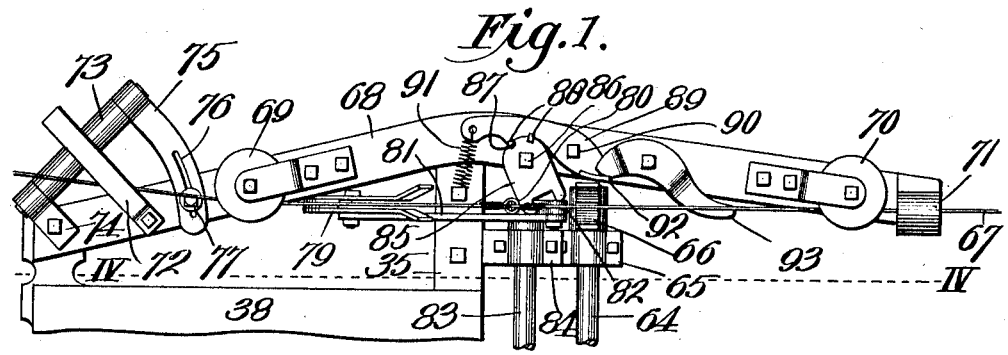
Figure 2:
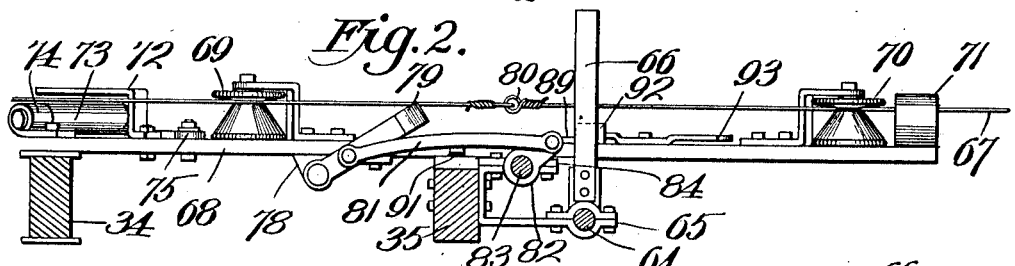
Figure 3:
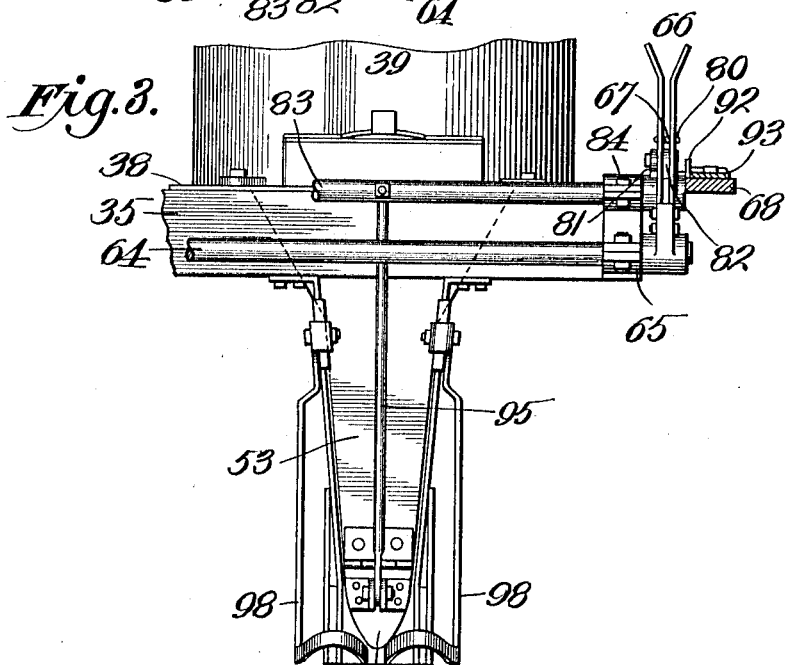

Figure 1, is an enlarged plan view of a part of the machine. Fig. 2 is a section on the line IV—IV of Fig. 1. Fig. 3, is a vertical transverse section of a part of the machine and showing a portion of the seed box and hopper mechanism.

In the said drawing, 34—35 indicate part of the frame of a check row planter and 38 a base mounted thereon, for the support of one or more seed boxes or hoppers 39, provided with a distributing tube 53, any suitable means, (not shown) being employed for effecting the discharge of seed from the box or hopper, through the instrumentality of a transverse rock shaft 64 arranged rearward of bar 35, and journaled in bearings 65 rigid with said bar 35, and secured to and projecting upwardly from the ends of said shafts 64 are forked arms 66 through which are adapted to extend alternately, that is as the machine travels back and forth across the field, a check-row wire 67 of the usual type.

68 is a pair of outwardly bowed horizontal bars secured at their front ends to the opposite ends of plates 36 and about midway their length to bar 35 and secured to each of said bars 68 are grooved guide rollers 69 and 70, the body portions of which are of upwardly tapering form for the purpose of holding the check row wire hereinafter referred to, against the upper flanges of said rollers, and secured to the rear extremities of the bars 68 are guide loops 71 by which the check-row wire is adapted to be held in operative relation to one of the rollers 70 accordingly as the machine is traveling in one direction or the other and to hold the check row wire reliably in engagement with the front roller 69, a keeper 72 is secured to each lever 68 to overlie the wire and tend to hold it down upon the antifriction roller 73 carried by said bar, the inner end of said roller being journaled in a bracket 74 secured to said bar and the rear end in a bracket 75 extending concentrically of the pivotal point of the adjacent bracket 74 and provided with a longitudinal slot 76 through which a clamping bolt 77 extends into the corresponding bar, the said roller 73 extending forwardly and inwardly so that when engaged by the wire it may rotate and thus eliminate friction on the wire to a large extent.

Pivoted to depending brackets 78 on bars 68 are forked arms 79 for engagement and operation by the enlargements 80 of the check row wire, in the progress of the machine, and said pivoted forks 79 are pivotally connected by links 81 with short crank arms 82 of the transverse rock shaft 83 journaled in bearings 84 projecting rearwardly from and carried by bar 35. One of said crank arms engages the inner or forked end of a swinging arm 85 pivoted for horizontal movement at 86 to one of the bars 68, and provided at its outer end with a pair of notches 87 for engagement with a pair of inwardly projecting teeth 88 of a lever 89 pivoted near its rear end at 90 upon said bar 68. At its front end the lever 89 is connected by a retractile spring 91 to the bar 35 and at its opposite extremity lever 89 is provided with an upwardly projecting flange 92 bearing against the front end of a lever 93 pivoted on the bar 68, the rear end of said lever lying within the plane of swinging movement of the arm 66 of rock shaft 64.

94 are gates closing the lower ends of the seed-distributing tubes 53, and pivotally connected at their lower ends to said gates are pull rods 95 which extend upwardly and are secured to the shaft 83 at the front side of the same so that as said shaft is rotated rearwardly and downwardly in the manner hereinafter explained the gates will be opened. The lower end of the seed tubes depend within the enlarged rear ends 96 of the usual furrow openers or runners.

Before starting the machine in operation the check row wire is placed in operative relation to the guide 71, forks 66 and 79, guide rollers 69 and 70 and roller 73 at the proper side of the machine, it being noted that at this time the crank arms 82 of shaft 83 are vertical, the swinging arms 85 are alined with said shaft and the teeth of the lever 89 are not in engagement with the teeth of said swinging arm. As the movement of the machine across the field is effected, the first projection or spur on the check row wire comes into engagement with forks 79 and being incapable of passing through the same, rocks it from a vertical position to the position shown in Figs. 1 and 2 and therefore through link 81 and crank arm 82, rocks shaft 83 rearwardly and effects the opening of the gates 94, to permit seed standing in the bottom of the tubes 53 to drop upon the ground. The operation of said crank shaft 83 effects rearward swinging movement of the swing arm 85 until the notches thereof are alined with the teeth of the lever 89 when said lever swings inward at the front end, under the pull of spring 91 and locks the gates in open position. Shortly after this opening or locking open of the gates is effected the enlargement or spur of the check row wire engages the forked arm 66 and swings the same rearwardly and thereby rocks shaft 64 and through the crank arm 63 thereof, links 62 and any suitable connections (not shown) effects stirring of the seed in the box or hopper. As the discharge of seed is effected through any suitable means from the box or hopper, fork 66 engages the rear end of lever 93 and causes the same to press inwardly upon the flange 92 of lever 89 and therefore swing the front portion of said lever outward to withdraw its teeth from engagement with notches 87 of the swinging frame 85. As this is effected the gate closes by gravitative action or otherwise and rocks shaft 83 back to its original position and through the crank arms 82 thereof returns the swinging arm to its original position. As this occurs the fork 66 is returned to its original position through the retractile action of a spring, not shown. This permits spring 91 to again swing the front portion of the lever 89 inwardly and incidentally through lip 92, return the lever 93 to its original position.

For planting cotton seed in particular, which is light and woolly and therefore slow in dropping, it is desirable to provide considerable time between the opening and closing of the gates and this I accomplish by first opening the gates through the action of fork 79 and then locking the gate open through the lever 89, swing arm 85, and one of the crank arms 82, the action of the second fork viz. 66, effecting the practically simultaneous dropping of another charge of seed down into said tube and the closing of the gates by the tripping of the trip lever 93.

From the above description it will be apparent that I have produced a check row seed planter embodying the features of advantage enumerated as desirable and I wish it to be understood that while I have illustrated and described the preferred embodiment of the invention I do not desire to be restricted to the exact details of construction shown and described as obvious modifications will suggest themselves to one skilled in the art.

I claim:

1. In a check row seed planter, a shaft, means actuated by a check row wire to rock said shaft, means to secure the shaft in the position to which it has been rocked, and means actuated by the check row wire to trip the securing means.

2. In a check row seed planter, a shaft, means actuated by a check row wire to rock said shaft, means to secure the shaft in the position to which it has been rocked, means actuated by the check row wire to trip the securing means, and means to return the rock shaft to its original position.

3. In a check row seed planter, a shaft, means actuated by a check row wire to rock said shaft, means to secure the shaft in the position to which it has been rocked, a second shaft, a forked arm rigid with the second shaft and adapted to be caused by the check row wire to rock said second shaft to trip said securing means, and independent means to rock said shafts back to their original positions.

4. In a check row seed planter, a seed box provided with a seed dropping tube, a gate controlling said tube, a rock shaft connected to said gate, means actuated by a check row wire to rock said shaft to open said gate, means to secure the rock shaft in its new position, means actuated by a check row wire to trip said securing means, and means to reverse the operation of the rock shaft to effect the closing of the gate.

5. In a check row seed planter, a seed box having a seed discharge, a seed tube to receive seed from said seed discharge, a gate controlling the seed tube, a rock shaft, a second rock shaft connected to open said gate, a forked arm connected to the said second rock shaft and adapted to be operated by the check row wire to open the gate, means to secure the said second rock shaft in the position to which it is adjusted by said forked arm, a forked arm carried by the first-named rock shaft and adapted to be moved by the checkrow wire to rock said rock shaft, means actuated by the last-named forked arm to trip the said securing means, and means to return the first named rock shaft and its connections to their original positions.

6. In a check row seed planter, a rock shaft having a crank arm, a swinging arm engaging and movable with the same, a pivoted fork linked to said crank arm and adapted to be operated by the check row wire to rock said arm and said swinging arm, a lever, means to cause the lever to interlock with the swinging arm after the latter is adjusted by the movement of said rock arm to hold the latter in its new position, means actuated by the check row wire to trip said lever from engagement with the said swinging arm, and means to return the rock arm, the swinging arm and the forked arm to their original positions after the tripping action occurs.

7. In a check row seed planter, a rock shaft having a crank arm, a swinging arm engaging and movable with the same, a pivoted fork linked to said crank arm and adapted to be operated by the check row wire to rock said arm and said swinging arm, a lever, means to cause the lever to interlock with the swinging arm after the latter is adjusted by the movement of said rock arm to hold the latter in its new position, a second lever engaging the first-named lever, a second fork adapted to be moved by the check row wire and cause to actuate the second lever to trip the first-named lever from engagement with the swinging arm, and means to return the said rock arm, the swinging arm and first named fork back to their original positions after the tripping action occurs.

8. In a check row seed planter, suitably supported check row wire guides, a rock shaft having a crank arm, a swinging arm movable back and forth with said crank arm, means actuated by the check row wire for operating said crank arm to cause it to rock said shaft and move said swinging arm, means to secure the swinging arm in the position to which it has been moved, means actuated by the check row wire to release the swinging arm, and means to rock said shaft back to its original position.

In testimony whereof I affix my signature, in the presence of two witnesses.

LEWIS H. BELTZER.

Witnesses:
C. J. TEQUE,
JOHN SMITH.

---

Copies of this patent may be obtained for five cents each, by addressing the "Commissioner of Patents, Washington, D. C."